US009891800B2

(12) United States Patent
Prakash et al.

(10) Patent No.: US 9,891,800 B2
(45) Date of Patent: Feb. 13, 2018

(54) METHOD AND APPARATUS FOR PROVIDING A NOTIFICATION MECHANISM

(75) Inventors: Priya Prakash, London (GB); Antonio Pedro Rezendes, London (GB); Guilherme Schneider, London (GB); Laura Junkkonen, Oulunsalo (FI)

(73) Assignee: Nokia Technologies Oy, Espoo (FI)

( * ) Notice: Subject to any disclaimer, the term of this patent is extended or adjusted under 35 U.S.C. 154(b) by 138 days.

(21) Appl. No.: 13/486,543

(22) Filed: Jun. 1, 2012
(Under 37 CFR 1.47)

(65) Prior Publication Data

US 2013/0145303 A1 Jun. 6, 2013

Related U.S. Application Data

(60) Provisional application No. 61/632,809, filed on Jun. 17, 2011.

(51) Int. Cl.
*G06F 3/0484* (2013.01)
*G06F 3/0488* (2013.01)
(Continued)

(52) U.S. Cl.
CPC ........ *G06F 3/04847* (2013.01); *G06F 3/0481* (2013.01); *G06F 3/04883* (2013.01);
(Continued)

(58) Field of Classification Search
CPC .................. G06F 3/0481; H04M 1/72597
(Continued)

(56) References Cited

U.S. PATENT DOCUMENTS 6,606,103 B1 * 8/2003 Hamlet et al. ................ 715/764
2004/0190794 A1 * 9/2004 Belanger ...................... 382/305
(Continued)

FOREIGN PATENT DOCUMENTS

WO   WO 2009/097555 A2   8/2009
WO   WO 2010/024986 A2   3/2010

OTHER PUBLICATIONS

Kevin Krause "Apple Copies Android, Introduces Pull-Down Notifications in iOS 5" Jun. 6, 2011 12 pages.*
(Continued)

*Primary Examiner* — Andrea Long
(74) *Attorney, Agent, or Firm* — Alston & Bird LLP

(57) ABSTRACT

A method for providing a notification mechanism may include causing provision of a notification bar at an edge of a touch screen display in response to an occurrence of an event where the notification bar provides information indicative of the event, enabling, responsive to user input, extension of the notification bar away from the edge of the touch screen display to display one or more levels of other notification classes in addition to the information indicative of the event, causing presentation of the notification bar to remain in an extended position away from the edge of the touch screen display so as to display one or more levels of notification classes upon cessation of the user input and causing, responsive to exposure of each level that has a subsequent level thereafter, an indication of existence of the subsequent level. A corresponding apparatus and computer program product are also provided.

28 Claims, 7 Drawing Sheets

(51) Int. Cl.
*G06F 3/0481* (2013.01)
*H04M 1/725* (2006.01)
(52) U.S. Cl.
CPC .... *H04M 1/72547* (2013.01); *H04M 1/72597* (2013.01); *H04M 2250/22* (2013.01)
(58) Field of Classification Search
USPC .............................. 715/779, 808, 833, 843
See application file for complete search history.

(56) References Cited

U.S. PATENT DOCUMENTS

| | | | |
|---|---|---|---|
| 2008/0220752 A1* | 9/2008 | Forstall et al. | 455/415 |
| 2009/0249247 A1* | 10/2009 | Tseng et al. | 715/808 |
| 2009/0319896 A1* | 12/2009 | Green et al. | 715/708 |
| 2010/0058231 A1* | 3/2010 | Duarte et al. | 715/800 |
| 2011/0028186 A1* | 2/2011 | Lee et al. | 455/566 |
| 2011/0072373 A1* | 3/2011 | Yuki | 715/764 |
| 2012/0204131 A1* | 8/2012 | Hoang et al. | 715/835 |
| 2012/0204191 A1* | 8/2012 | Shia et al. | 719/318 |
| 2013/0007665 A1* | 1/2013 | Chaudhri et al. | 715/830 |

OTHER PUBLICATIONS

Mozilla Thunderbird When new messages arrive . . . Sep. 25, 2006 3 pages.*
Appearance Preferences Jun. 30, 2010 2 pages.*
Office Action for European Application No. EP 12 733 787.1 dated Sep. 22, 2014.
International Search Report and Written Opinion for Application No. PCT/FI2012/050552 dated Oct. 31, 2013.
Status bar—Event-driven notification | Facebook, XP-002685476 [online] [retrieved Oct. 17, 2012]. Retrieved from the Internet: <URL: http://www.facebook.com/notes/android-patterns/status-bar-event-driven-notification/193074337383906>. (dated Feb. 4, 2011) 2 pages.
TechCrunch—Androi, XP-002685477 [online] [retrieved Oct. 18, 2012]. Retrieved from the Internet: <URL: http://www.androidzoom.com/android_applications/news_and_magazines/techcrunch_gucd.html>. (dated 2010), 1 page.
Jim Blackler—QuickCalendar, an application for Android written in Java, XP-002685478 [online] [retrieved Oct. 17, 2012]. Retrieved from the Internet: <URL: http://jimblacker.net/blog/?p=67>. (dated Jan. 30, 2009), 6 pages.
Orantia, J., How to get Android-style notification on your iPhone, XP-002685479 [online] [retrieved Oct. 17, 2012]. Retrieved from the Internet: <URL: http://apcmag.com/how-to-get-android-style-notifications-on-your-iphone.htm>. (dated May 20, 2011), 3 pages.
Window shade | Android Interaction Design Patterns |, XP-002685480 [online] [retrieved Oct. 18, 2012]. Retrieved from the Internet: <URL: http://www.androidpatterns.com/uap_pattern/window-shade>. (May 3, 2011), 5 pages.
Androidians: ExpandableListActivity in Android, XP-002685482 [online] [retrieved Oct. 17, 2012]. Retrieved from the Internet: <URL: http://smartandroidians.blogspot.nl/2010/04/expandablelistactivity-inandroid.html>. (dated Apr. 26, 2010), 3 pages.
Vince, Samsung Galaxy Ace review, XP-002685483 [online] [retrieved Oct. 18, 2012]. Retrieved from the Internet: <URL: http://www.tracyandmatt.co.uk/blogs/index.php/samsung-galaxy-ace=review>. (dated Apr. 6, 2011), 12 pages.
Office Action for European Application No. 12733787.1 dated Jun. 24, 2015.
Office Action for European Application No. 12733787.1 dated Sep. 29, 2016.

* cited by examiner

METHOD AND APPARATUS FOR PROVIDING A NOTIFICATION MECHANISM

CROSS REFERENCE TO RELATED APPLICATION

This application claims priority to and the benefit of U.S. Provisional Application No. 61/623,809, filed on Jun. 17, 2011, which is incorporated by reference herein in its entirety.

TECHNOLOGICAL FIELD

Some example embodiments of the present invention relate generally to user interface technology and, more particularly, relate to a method and apparatus for providing a notification mechanism.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, electronic book or reading device, etc.

In many situations, it may be desirable for the user to interface with a device such as a mobile terminal for the provision of an application or service. A user's experience during certain applications such as, for example, web browsing or navigating through content may be enhanced by using a touch screen display as the user interface. Furthermore, some users may have a preference for use of a touch screen display for entry of user interface commands over other alternatives. In recognition of the utility and popularity of touch screen displays, many devices, including some mobile terminals, now employ touch screen displays. As such, touch screen devices are now relatively well known in the art, with numerous different technologies being employed for sensing a particular point at which an object may contact the touch screen display.

BRIEF SUMMARY

A method, apparatus and computer program product are provided to enable the provision of a notification mechanism. In some cases, for example, a notification bar may be provided that may advance, responsive to user input, across a portion of a display (e.g., from an edge portion of the display toward a middle portion of the display) like a blind or a wave to form a notification blind. The notification blind may both advance and retract responsive to the user "pulling" on the notification blind or providing some other input indicative of an intent to advance or retract the notification blind. Furthermore, in some examples, the notification blind may advance (and/or retract) on a level-wise basis such that each of a plurality of levels corresponding to access mechanisms for different classes of notifications and/or applications may be provided in each of the respective levels. The notification blind may also provide a bobbing indication to hint at the occurrence of new events and/or new level activity.

Some embodiments of the invention may provide a method, apparatus and computer program product for improving user experience relating to devices having touch screen interfaces. As a result, for example, mobile terminal users may enjoy improved capabilities with respect to accessing information related to content and other services or applications that may be used in connection with a touch screen display.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 3A:
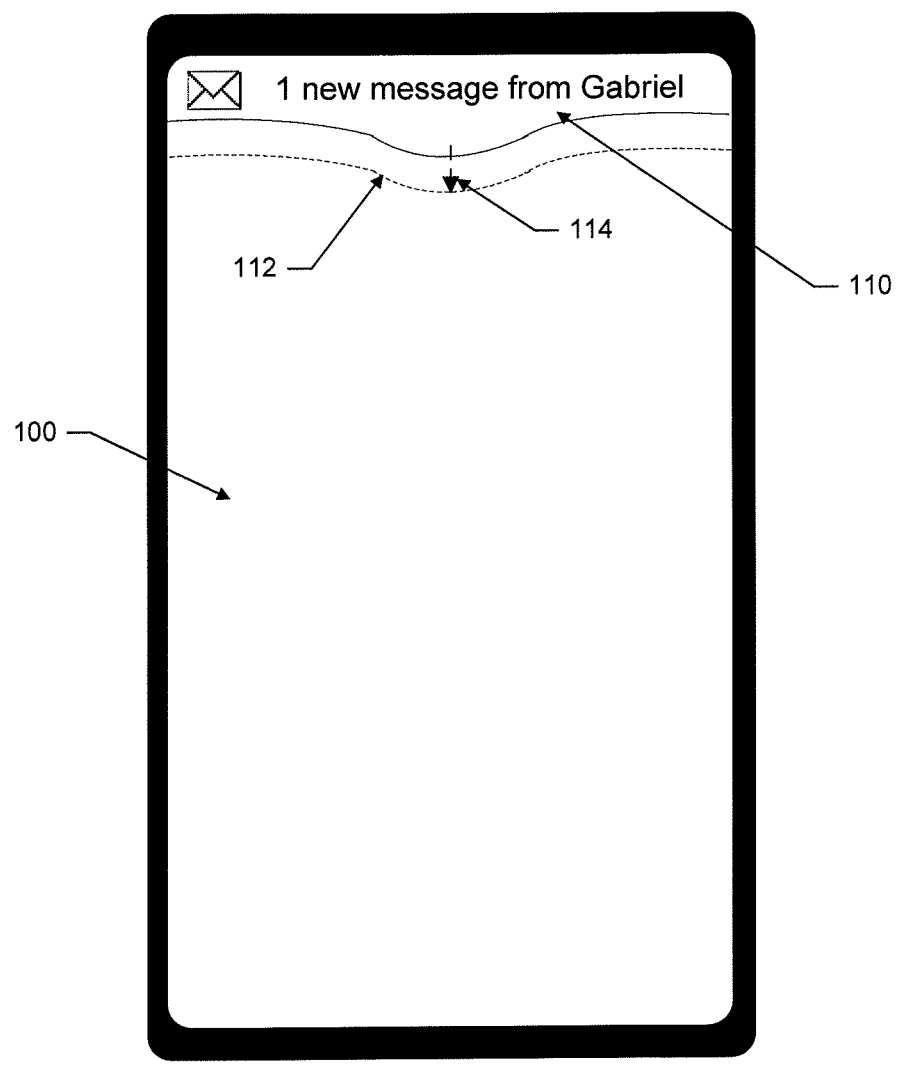
Figure 3B:
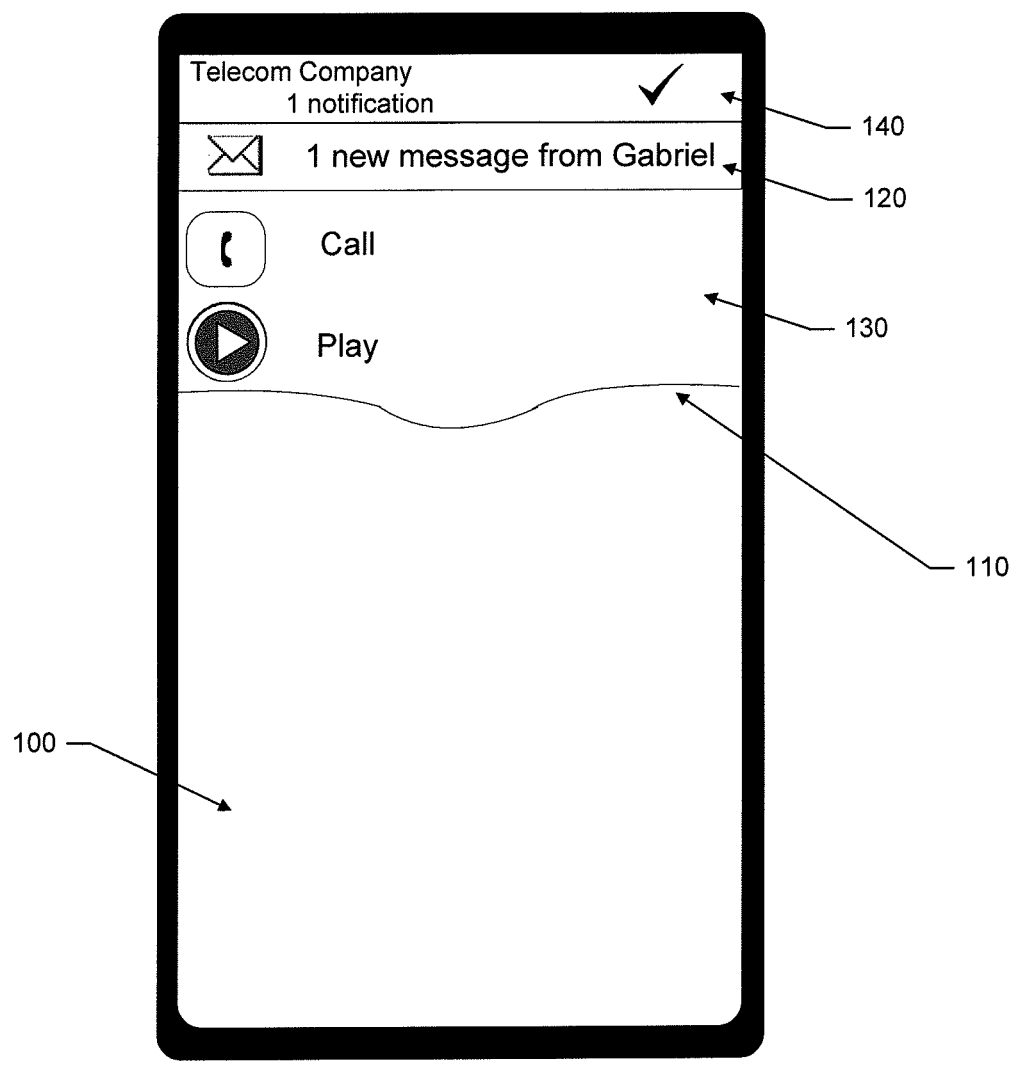
Figure 3C:
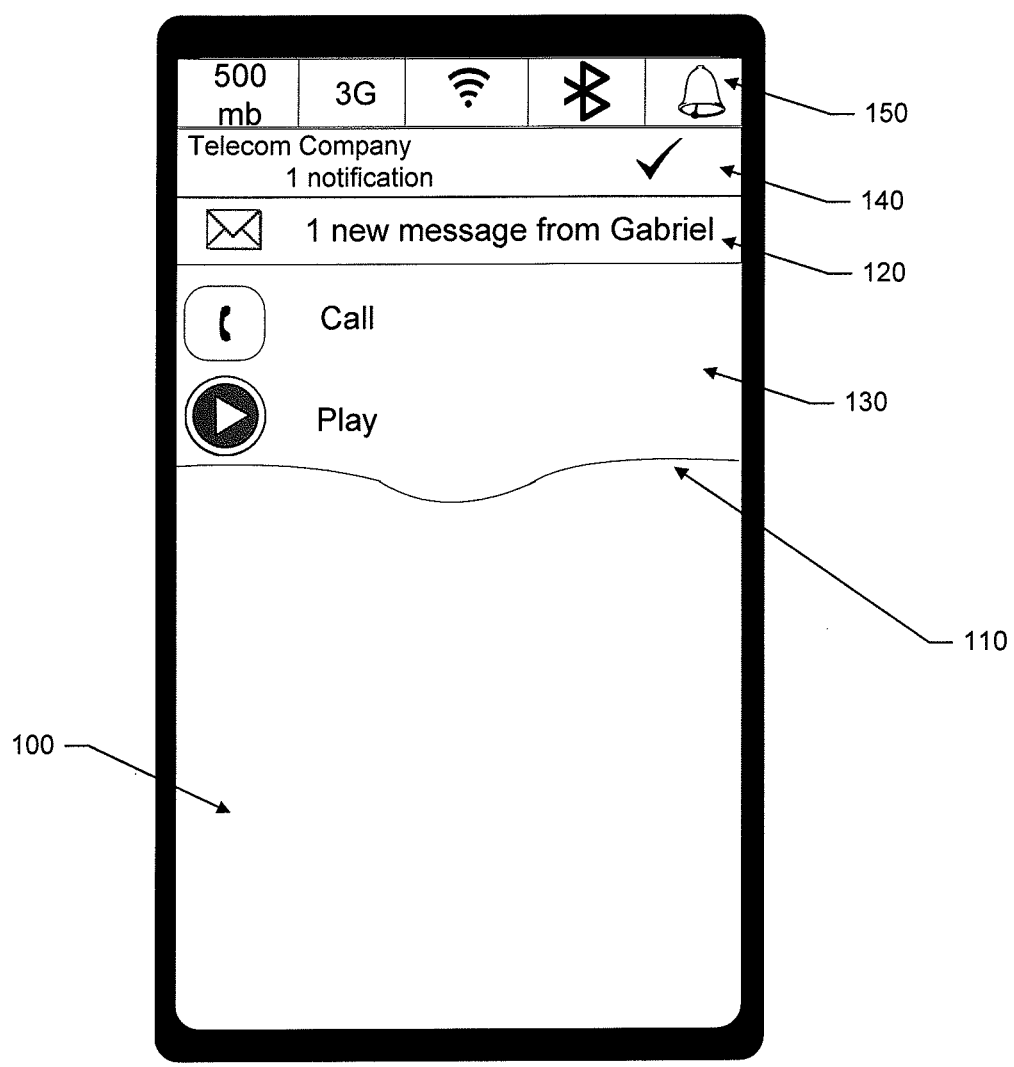
Figure 3D:
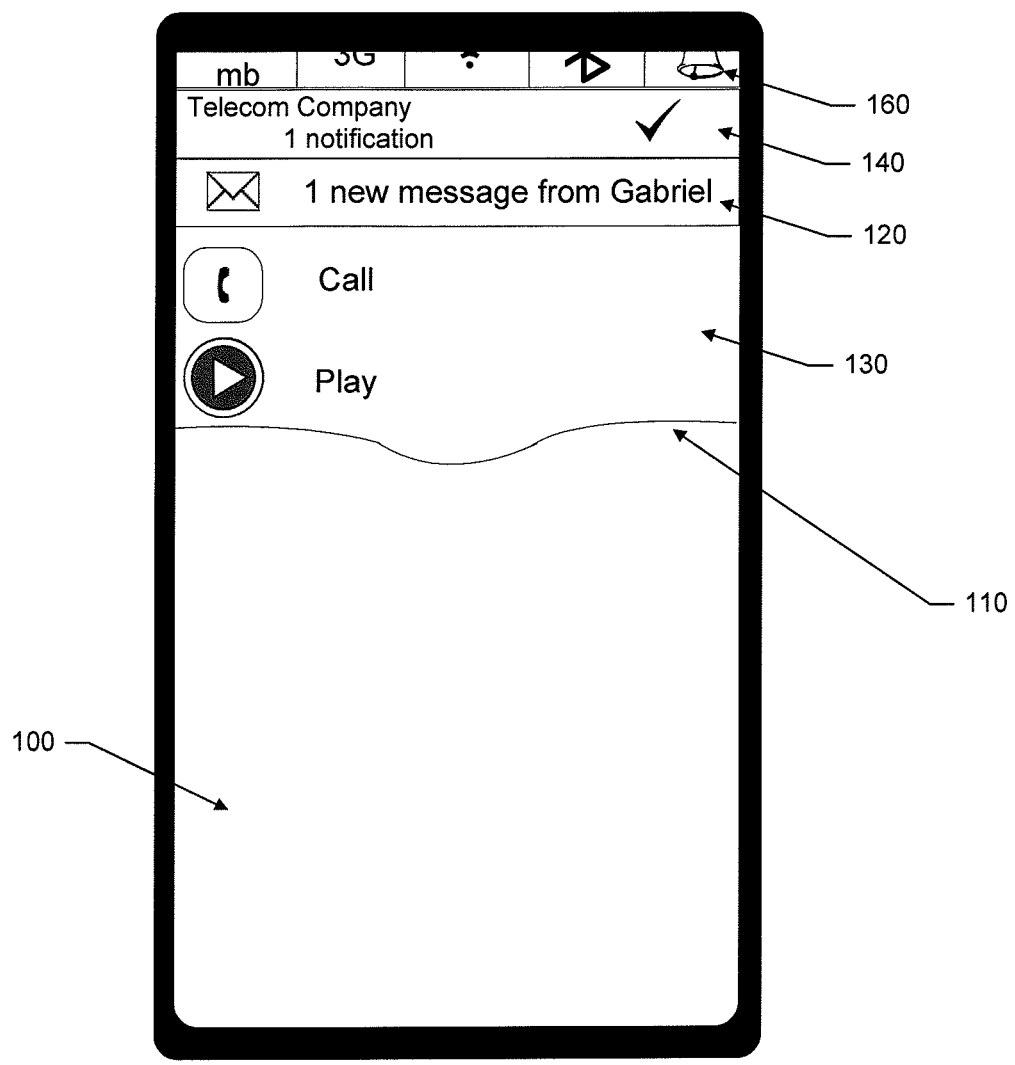
Figure 4:
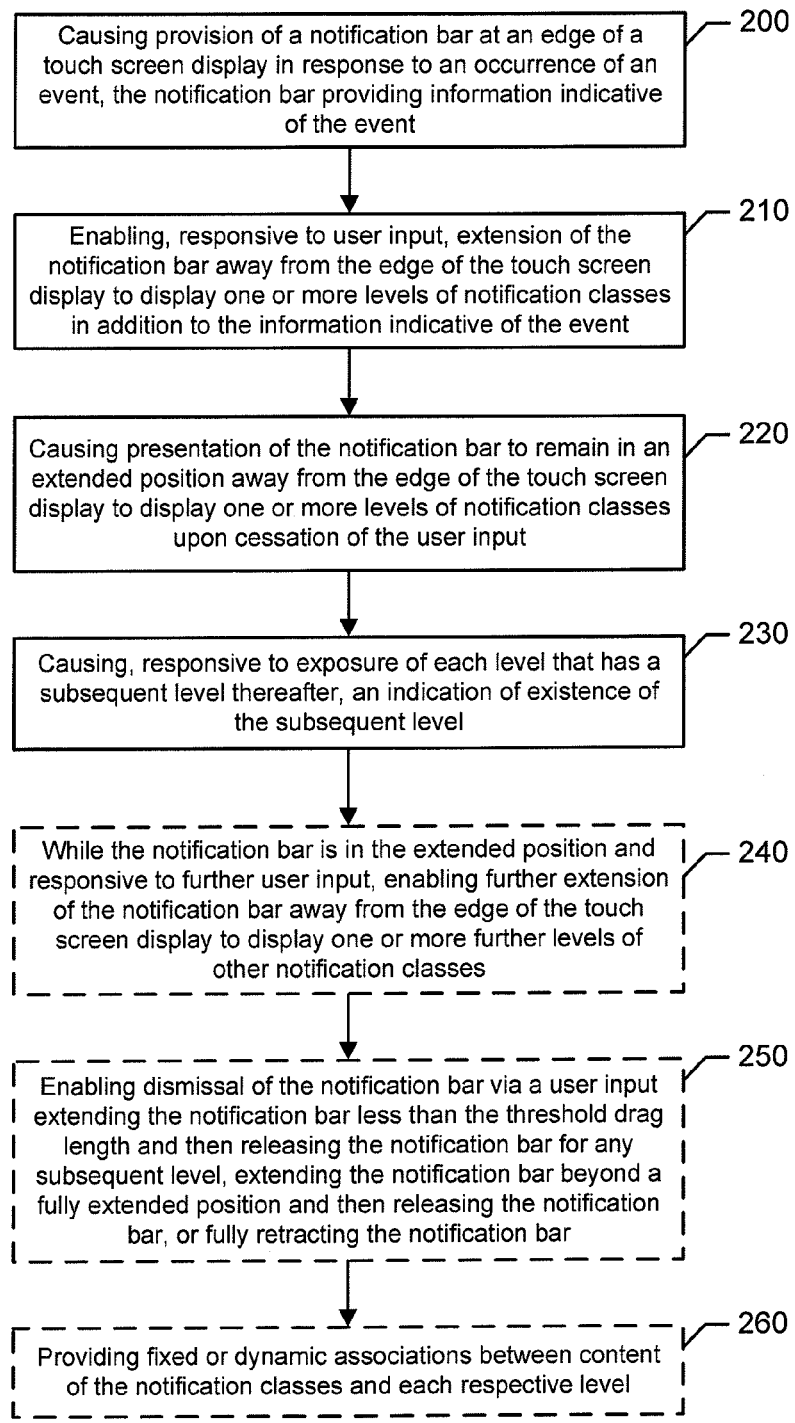

FIG. 3, which includes FIGS. 3A to 3D, illustrates an example series of screens that may be presented when operating according to an example embodiment of the present invention; and FIG. 4 is a block diagram according to an example method for providing a notification mechanism according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

The use of a touch screen interface is often attractive to users due to the generally intuitive nature of the interface. Various activities such as selecting an object, dragging an object, drawing a symbol, turning a page, zooming in or out, and/or the like, are often performed using simple gestures that seem to naturally coincide with the resulting activity. Thus, touch screen devices have been becoming increasingly popular.

The touch screen interface typically displays content on a display screen and also accepts inputs from the user through the same touch screen. Thus, most touch screen devices provide access to various functions through one or more inputs that are entered via interaction of an object (e.g., a finger or stylus) with the touch screen display. Dependent upon the screen being presented, various options may be accessed by selection of one or more icons or menu items that may be displayed. In some cases, these selections must be made in sequence in order to access certain content or functionalities. However, in other cases, content and/or functionalities may be accessed via a single input. Generally speaking, reduction in the number of interactions that a user must employ in order to access content or functions is desirable since the user experience is enhanced when the user can achieve desired results with minimal effort.

Given the increasing number of applications that can generate and/or receive new event related information at any given time, there is an increasing potential that different classes of content or functionality, associated with corresponding different applications, may experience events (e.g., updates, new material, new activity, status changes, and/or the like) of which the user may be interested in receiving notifications. Example embodiments of the present invention may provide some ways by which the user may be made aware of these events in an unobtrusive, yet interesting manner.

In this regard, some example embodiments may provide for a notification bar that may generally be provided at an edge (often, but not exclusively, the top edge) of a display screen. The notification bar may be provided in such a way that the user is informed of activities that may occur in relation to any of a number of classes of notifications or applications. In some examples, the notification bar may appear only when an event has occurred. In this regard, for example, the notification bar (which may be referred to as a notification wave or notification blind in some examples due to the shape and/or movement of the bar being similar to that of an advancing wave or an advancing blind or mini-blind) may appear and provide a bobbing motion to hint at the existence of other levels of information that may be accessed by advancing the notification bar. The notification bar may advance responsive to user input via a drag operation, screen tapping or other inputs. In some examples, the notification bar may advance across a portion of a display (e.g., from an edge portion of the display toward a middle portion of the display) like a blind or a wave. The notification bar may both advance and retract responsive to the user "pulling" on the notification blind or responsive to the user providing some other input indicative of an intent to advance or retract the notification bar (e.g., tapping). Furthermore, for example, the notification blind may advance (and/or retract) on a level-wise basis such that each of a plurality of levels corresponding to access mechanisms for different classes of notifications and/or applications may be provided in each of the respective levels.

Some example embodiments may provide users with a relatively intuitive interaction mode by which to quickly receive notifications associated with different levels of information. Moreover, in some cases, the notifications may further provide access to information, functionalities and/or applications that may be related (directly or indirectly) to events triggering corresponding notifications. Thus, for example, a static or dynamic list of applications or content may be provided at one level and those applications or content items may be fixed (e.g., in static examples) items that are commonly associated with or useful in connection with a corresponding event or notification, or the applications or content items may be dynamic such that they are determined based on current conditions and/or the nature or circumstances under which a corresponding event or notification has occurred.

Figure 1:
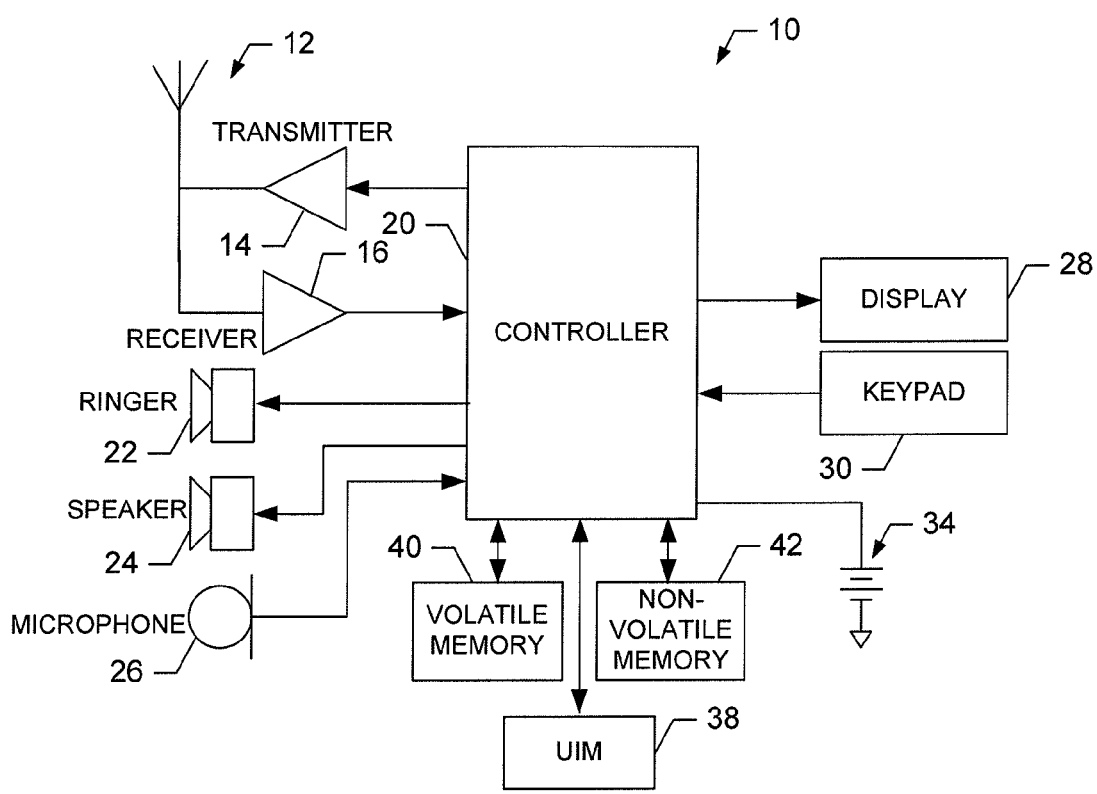
FIG. 1 is a schematic block diagram of a mobile terminal according to an example embodiment of the present invention.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing quick access to device functionality responsive to a touch gesture are displayed. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
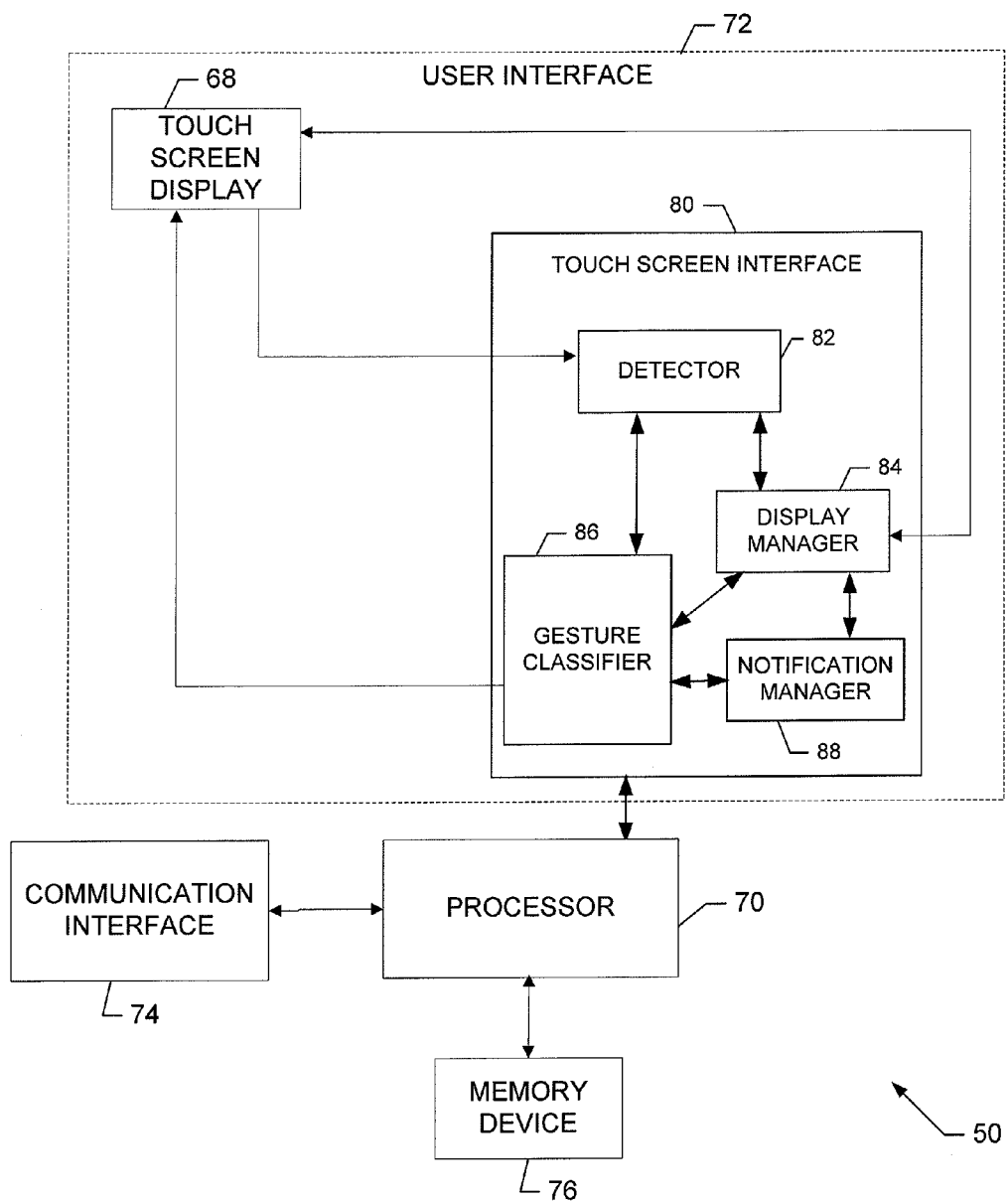
FIG. 2 is a schematic block diagram of an apparatus for providing a notification mechanism according to an example embodiment of the present invention.

It should also be noted that while FIG. 2 illustrates one example of a configuration of an apparatus for providing a notification mechanism, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing a notification mechanism is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to cause provision of an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface 72 may be in communication with the touch screen display 68 to receive indications of user inputs at the touch screen display 68 and to modify a response to such indications based on corresponding user actions that may be inferred or otherwise determined responsive to the indications.

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, a gesture classifier 86 and a notification manager 88. Each of the detector 82, the display manager 84, the gesture classifier 86 and the notification manager 88 may be any device or means embodied in either hardware or a combination of hardware and software configured to perform the corresponding functions associated with the detector 82, the display manager 84, the gesture classifier 86 and the notification manager 88, respectively, as described herein. In an exemplary embodiment, each of the detector 82, the display manager 84, the gesture classifier 86 and the notification manager 88 may be controlled by or otherwise embodied as the processor 70.

The detector 82 may be in communication with the touch screen display 68 to receive indications of user inputs in order to recognize and/or determine a touch event based on each input received at the detector 82. A touch event may be defined as a detection of an object, such as a stylus, finger, pen, pencil, glove or any other pointing device, coming into contact with a portion of the touch screen display in a manner sufficient to register as a touch. In this regard, for example, a touch event could be a detection of pressure on the screen of the touch screen display 68 above a particular pressure threshold over a given area or the detection of a change in the electrostatic field of the touch screen display 68 at a particular location. As such, some touch events may not actually require physical contact with the touch screen display 68. For example, in some cases, the touch screen display 68 may be configured to detect one or more objects (e.g., a finger or fingers) hovering over the touch screen display 68. Gestures associated with the object or objects may also be detected in some cases, even without physical contact with the touch screen display 68. For example, in some cases, a touch event may be sensed through an article of clothing, fabric, flexible material, thin material, and/or the like. Subsequent to each touch event, the detector 82 may be further configured to pass along the data corresponding to the touch event (e.g., location of touch, length of touch, number of objects touching, touch pressure, speed of movement, direction of movement, length of delay, frequency of touch, etc.) to the gesture classifier 86 for gesture classification.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, swipe, pinch event (e.g., a pinch in or pinch out) and/or the like.

A touch may be defined as a touch event that impacts a single area (without or with minimal movement on the surface of the touch screen display 68) and then is removed. A multi-touch may be defined as multiple touch events sensed at the same time (or nearly the same time). A stroke event (or swipe) may be defined as a touch event followed immediately by motion of the object initiating the touch event while the object remains in contact with the touch screen display 68. In other words, the stroke event may be defined by motion following a touch event thereby forming a continuous, moving touch event defining a moving series of instantaneous touch positions (e.g., as a drag operation, swipe or as a flick operation). Multiple strokes and/or touches may be used to define a particular shape or sequence of shapes to define a character.

In an example embodiment, the gesture classifier 86 may be configured to classify gestures and communicate the classification to the notification manager 88 and/or the display manager 84 in order to inform the notification manager 88 and/or the display manager 84 of a gesture received in connection with the touch screen display 68 and/or in connection with objects presented on the touch screen display 68. In an example embodiment, certain swipe gestures (e.g., pulling on or extending a notification bar, notification wave or notification blind) or certain tap gestures (e.g., single, multiple or combinations of taps in predefined sequences) may correlate to functions performed by the notification manager 88 that are to cause representative changes on the touch screen display 68 as provided by the display manager 84.

The notification manager 88 may be configured to interact with the display manager 84 to cause a corresponding response to be generated on the touch screen display 68. For example, in response to detection of a swipe gesture (or tap gesture) performed in connection with a notification bar, the display manager 84 may cause presentation of one or more layers of information. The layers of information may include notifications regarding different content, applications or functions and/or access mechanisms for implementing functionality associated with different content, applications or functions. In some cases, different levels may be associated with different applications or content. However, in other cases, different levels may be associated with different classes of applications or content. Other examples may include combinations of the above, where some levels are associated with different content or applications and other levels are associated with different classes of applications or content. As such, each level may include notifications about corresponding content, applications or classes of content or applications. Alternatively or additionally, one or more levels may include links, icons or other access mechanisms by which to access information or functions associated with respective different content, applications or classes of applications.

FIG. 3, which includes FIGS. 3A to 3D, illustrates an example of operation of the notification manager 88 and the corresponding display activity that is provided by the display manager 84 according to one example embodiment. In this regard, FIG. 3A illustrates a display screen 100. Although no content is shown on the display screen 100, it should be appreciated that any content associated with any application, a home screen, idle screen, locked screen and/or the like may be presented on the display screen 100 initially. Responsive to the occurrence of an event (e.g., receipt of a message or email from a particular contact) a notification bar 110 (which may alternatively be referred to as a notification wave or notification blind) may be presented. The presentation of the notification bar 110 may be provided as a popup item displayed at the top of the display screen 100. In an example embodiment, the notification bar 110 may be provided with a bobbing action (including movement as indicated by the dashed border 112 and the arrow 114) to indicate that further information and/or levels of content are available.

According to one example, by pulling down the notification bar 110 (although tapping or other interactions may be used in some cases), the user may be enabled to extend the notification bar 110 to display one or more levels of information. FIG. 3B illustrates an extension of the notification bar 110, similar to the way a shade or blind may be extended over a window of a house, to expose multiple levels of information. As shown in FIG. 3B, the notification regarding the message from the particular contact of FIG. 3A is shown as a first level 120. A set of application shortcuts are also shown as a second level 130. Furthermore, an additional notification regarding a different application is also provided as a third level 140. In an example embodiment, the levels may be exposed one at a time by pulling the notification bar 110 incrementally down until a subsequent level is exposed. This may be done to expose the first level 120, the first and second levels 130, the first, second, and third levels 120, 130 and 140, or more levels. The ordering of the levels may be predetermined, or may be determined by the user. Upon cessation of the user input, the notification bar 110 may remain in an extended position away from the edge of the touch screen display so as to display one or more levels of information, such as shown in FIG. 3B. The extended position is one of a plurality of such positions, that is, one of a plurality of candidate extended positions, in which the notification bar is capable of being caused to remain. The notification bar 100 may remain in this extended position while awaiting further user input. In this regard, the further user input is a separate and distinct user input, such as following release or removal of the prior user input, as opposed to a continuation of the prior user input following a pause or the like. In this regard, in response to further user input while the notification bar is in the extended position, the notification bar may be further extended away from the edge of the touch screen display to display one or more further levels of other notification classes.

FIG. 3C illustrates the extension of the further extension of the notification bar 110 to include a notification class for additional information in a fourth level 150. The fourth level 150 may include, for example, information on the remaining amount available for use in the user's data plan, an indication of the serving network, an indication of signal strength, an indication of one or more currently connected and/or accessible networks, an indication of an available application (e.g., an alarm application), and/or the like. As each level is sequentially exposed, the notification bar 110 may provide a partial preview 160 of the availability of a subsequent level as shown in FIG. 3D, which shows a transition from FIG. 3A to 3B indicating that the view in FIG. 3C is available if an additional level is extended.

In an example embodiment, the contents of each level may have a fixed association or dynamic association with a particular level. For example, in fixed association scenarios, an initial level (or levels) may be predefined to be associated with one or more messaging applications (e.g., SMS (short message service) messages, emails, voice messages, etc.) and subsequent levels may be associated with, for example, informational notices, currently running applications, available applications, a predefined set of application shortcuts, an indication of missed calls, different messaging applications than the one or more that are associated with an earlier level, or indications of available content, networks, bandwidth or functions. Each of these examples may form, alone or in combination, notification classes that may be assigned to different levels to which the notification bar 110 may be extended in various examples. The predefined set of applications may be predefined globally, or may include different sets for different current applications or current context situations.

In examples that employ a dynamic association for level content determinations, dynamic criteria such as recent activity, statistical probability regarding activity generally or in a given context, initial state or application, and/or the like may be used to determine the content to be associated with each level. Thus, for example, level one may include information related to a most recent event. Level two may include a set of application shortcuts that are most commonly employed in response to or proximate in time to the most recent event. Additional levels may include content that statistically is generally most commonly used. Accordingly, for example, the notification manager 88 may include a table or other indication of weighted values for corresponding different notification classes. The weights may be fixed or dynamically associated to context situations, based on current conditions and events that are known to the notification manager 88, the notification manager 88 may accumulate weighted values for each notification class and select those notification classes that have an accumulated weighted value above a threshold amount for presentation (or potential presentation) as a separate level that is accessible through extension of the notification bar 110.

In some examples, any number of levels may be presented or a maximum number of levels may be prescribed. The maximum number of levels, if employed, may vary based on context or may depend on the maximum number that can fit on the touch screen display 68 at one time. If no limit to the number of levels is provided, or any time the presentation of levels is not limited by the boundaries of the touch screen display 68, a scroll indication may be presented to indicate where the user's view pane is relative to the current full extension of the notification bar 110 in situations where the notification bar 110 is extended beyond the length of the touch screen display 68.

Selection of an item from the notification bar 110 may close the notification bar 110 in some cases (e.g., to launch another application selected from set of application shortcuts). However, in other cases, selection of an item from the notification bar 110 may merely close out the corresponding level from which the item was selected, but otherwise leave remaining portions of the notification bar 110 displayed until the user closes the notification bar 110. As such, notification classes may be dismissed and therefore removed as a separate level presented in association with extension of the notification bar 110. In some cases, dismissal of a particular level may be accomplished by selecting the level and using a menu option to dismiss the corresponding level, or merely by selecting an item in the corresponding level. In other cases, one or more levels may include a dismissal box or option that may be selected in order to dismiss the corresponding level.

In some example embodiments, the notification bar 110 may be presented from either a locked state or an unlocked state. By providing the notification bar 110 and a bobbing action indicating that there is further available content at other levels, the notification manager 88 may inform the user of a device that is locked or unlocked, that the notification bar 110 may be extended to see various levels having different notification classes associated therewith. In some cases, if the user extends the notification bar 110 from a locked state, the device may be unlocked at least to the extent that the user may interact with the notification bar 110. If the user selects certain options from the notification bar 110 that launch other applications or functions, the device may be unlocked either fully or until the user completes an action tied to the other application or function after which time the device may immediately revert to the locked state.

In an example embodiment, extension of the notification bar 110 may be handled based on the extension of the notification bar 110 (e.g., with a drag operation on the touch screen display 68) relative to various thresholds. For example, there may be a threshold drag length associated with extending from one level to another. In some cases, the threshold drag length may be sufficient to display at least a predetermined amount of the partial view of a next level. Thus, to extend two levels, the user may extend the notification bar 110 until the first and second of the two levels are completely in view and the partial view for the third level comes into view. If the user then releases the drag operation when the partial view of the third level comes into view, the notification bar 110 may display the view including the expanded two levels with the partial view no longer being displayed.

In an example embodiment, the notification bar 110 may be completely dismissed or removed in a number of ways. In one example, the user may enter a sequence of taps or other inputs to dismiss the notification bar 110. In another example, the user may insert a drag operation that pulls the notification bar 110, but does not reach the threshold drag length needed to reach a next level, and then release the drag operation. In still another example, the user may insert a drag operation to expose all levels and then stretch the notification bar 110 slightly further and release the notification bar 110 similar to the releasing of a window shade to have the shade recoil to a fully retracted position. In some embodiments, the user may insert a drag operation in a retracting direction (e.g., upward if the notification bar 110 is at the top of the touch screen display 68 or downward if the notification bar 110 extends up from the bottom of the touch screen display 68) of at least a threshold amount.

Accordingly, example embodiments may provide a hinting mechanism to indicate that an event has occurred, but also indicate that other levels of information may be explored using an expandable notification bar.

FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include causing provision of a notification bar at an edge of a touch screen display in response to an occurrence of an event, the notification bar providing information indicative of the event at operation 200, enabling, responsive to user input, extension of the notification bar away from the edge of the touch screen display to display one or more levels of other notification classes in addition to the information indicative of the event at operation 210, causing presentation of the notification bar to remain in an extended position away from the edge of the touch screen display so as to display one or more levels of notification classes upon cessation of the user input at operation 220, and causing, responsive to exposure of each level that has a subsequent level thereafter, an indication of existence of the subsequent level at operation 230.

In some embodiments, certain ones of the operations above may be modified or further amplified as described below. Moreover, in some embodiments additional optional operations may also be included (some examples of which are shown in dashed lines in FIG. 4). It should be appreciated that each of the modifications, optional additions or amplifications below may be included with the operations above either alone or in combination with any others among the features described herein. In this regard, the extended position of the notification bar is one of a plurality of such positions in which the notification bar is capable of being caused to remain. As such, the method may optionally also enable further extension of the notification bar in response to further user input while the notification bar is in the extended position, as shown at operation 240. The further extension of the notification bar is in a direction away fro the edge of the touch screen display so as to display one or more further levels of other notification classes. In some embodiments, the method may further include enabling dismissal of the notification bar via a user input extending the notification bar less than the threshold drag length and then releasing the notification bar for any subsequent level, extending the notification bar beyond a fully advanced position and then releasing the notification bar, or fully retracting the notification bar at operation 250. In this regard, the fully advanced position is the position of the notification bar in which all levels are exposed and there are no subsequent levels that have not yet been exposed. In some examples, the method may further include providing fixed associations between content of the notification classes and each respective level and/or providing dynamic associations between content of the notification classes and each respective level at operation 260. In some embodiments, enabling extension of the notification bar may include enabling extension of the notification bar to expose subsequent levels responsive to a drag operation extending the notification bar to a threshold drag length corresponding to each respective subsequent level. In an example embodiment, causing the indication of existence of a subsequent level may include causing a display of a partial preview of a next level in connection with expanding the notification bar to expose a current level. In some cases, the notification classes may include notifications regarding additional events or available items associated with corresponding different levels. In some embodiments, causing provision of the notification bar may include causing provision of a bobbing action of the notification bar indicating further available content at other levels.

In an example embodiment, an apparatus for performing the method of FIG. 4 above may comprise a processor (e.g., the processor 70) configured to perform some or each of the operations (200-260) described above. The processor 70 may, for example, be configured to perform the operations (200-260) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-260 may comprise, for example, the touch screen interface 80 (or respective different components thereof). Additionally or alternatively, at least by virtue of the fact that the processor 70 may be configured to control or even be embodied as the touch screen interface 80, the processor 70 and/or a device or circuitry for executing instructions or executing an algorithm for processing information as described above may also form example means for performing operations 200-260.

An example of an apparatus according to an example embodiment may include at least one processor and at least one memory including computer program code. The at least one memory and the computer program code may be configured to, with the at least one processor, cause the apparatus to perform the operations 200-260 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 200-260 (with or without the modifications and amplifications described above in any combination).

In some cases, the operations (200-260) described above, along with any of the modifications may be implemented in a method that involves facilitating access to at least one interface to allow access to at least one service via at least one network. In such cases, the at least one service may be said to perform at least operations 200-260.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

causing provision of a notification bar at an edge of a touch screen display in response to an occurrence of an event, the notification bar providing information indicative of the event;

enabling, responsive to user input, extension of the notification bar away from the edge of the touch screen display to display a first level associated with a notification class from among a plurality of notification classes, wherein dynamic criteria defines the notification class to be included in the first level based upon a statistical probability that the content of the notification class included in the first level will be used; and causing presentation of the notification bar to remain in an extended position away from the edge of the touch screen display so as to display the first level upon cessation of the user input, wherein enabling extension of the notification bar comprises enabling extension of the notification bar to expose the first level responsive to a drag operation extending the notification bar to at least a threshold drag length corresponding to the first level, a further level associated with a different notification class being exposed in response to a further, separate and distinct, user input while the notification bar is extended comprising a drag operation in a retracting direction to expose a second level not previously exposed.

2. The method of claim 1, further comprising causing an indication of existence of a subsequent level by causing a display of a partial preview of a next level in connection with expanding the notification bar to expose a current level.

3. The method of claim 1, wherein the notification classes include notifications regarding additional events or available items associated with corresponding different levels.

4. The method of claim 1, wherein causing provision of the notification bar further comprises causing provision of a bobbing action of the notification bar indicating further available content at other levels.

5. The method of claim 1, wherein the dynamic criteria that defines the one or more notification classes included in the respective level is based upon a statistical probability that one or more application shortcuts will be employed in response to or proximate in time to a most recent event or that the content will be statistically most commonly used.

6. The method of claim 1, further comprising causing, and responsive to exposure of each level that has a subsequent level thereafter, an indication of existence of the subsequent level that includes one or more different notification classes relative to the notification classes of the one or more levels that are displayed.

7. The method of claim 1, further comprising enabling further extension of the notification bar to display a second level, separate from the first level, including one or more application shortcuts, wherein enabling extension and further extension of the notification bar comprises the first level to be displayed prior to causing the second level including the one or more application shortcuts to be displayed, and wherein the dynamic criteria defines the one or more application shortcuts included in the second level based upon the application shortcuts that are most commonly employed.

8. The method of claim 7, wherein enabling further extension of the notification bar comprises causing one or more additional levels of notification classes to be presented following the display of the second level including one or more application shortcuts.

9. The method of claim 7, wherein enabling further extension of the notification bar comprises causing the second level of one or more application shortcuts to be displayed at a leading edge of notification bar followed by the first level.

10. The method of claim 1, further comprising:
enabling further extension of the notification bar in order to cause one or more additional levels of notification classes to be displayed; and
causing a respective level including a respective notification class to be closed in response to a selection by a user while one or more other levels of notification classes continue to be displayed.

11. The method of claim 10, wherein causing a respective level to be closed comprises closing the respective level including the respective notification class in response to user selection of an item from the respective notification class.

12. An apparatus comprising at least one processor and at least one memory including computer program code, the at least one memory and the computer program code configured to, with the processor, cause the apparatus to at least:
cause provision of a notification bar at an edge of a touch screen display in response to an occurrence of an event, the notification bar providing information indicative of the event;
enable, responsive to user input, extension of the notification bar away from the edge of the touch screen display to display a first level associated with a notification class from among a plurality of notification classes, wherein dynamic criteria defines the notification class to be included in the first level based upon a statistical probability that the content of the notification class included in the first level will be used; and
cause presentation of the notification bar to remain in an extended position away from the edge of the touch screen display so as to display the first level upon cessation of the user input,
wherein enablement of the extension of the notification bar comprises enabling extension of the notification bar to expose the first level responsive to a drag operation extending the notification bar to at least a threshold drag length corresponding to the first level, a further level associated with a different notification class being exposed in response to a further, separate and distinct, user input while the notification bar is extended comprising a drag operation in a retracting direction to expose a second level not previously exposed.

13. The apparatus of claim 12, wherein the at least one memory and the computer program code are further configured to, with the processor, cause an apparatus to cause the indication of existence of a subsequent level by causing a display of a partial preview of a next level in connection with expanding the notification bar to expose a current level.

14. The apparatus of claim 12, wherein the notification classes include notifications regarding additional events or available items associated with corresponding different levels.

15. The apparatus of claim 12, wherein the at least one memory and the computer program code are configured to, with the processor, cause the apparatus to cause provision of the notification bar further by causing provision of a bobbing action of the notification bar indicating further available content at other levels.

16. The apparatus of claim 12, wherein the dynamic criteria that defines the one or more notification classes included in the respective level is based upon a statistical probability that one or more application shortcuts will be employed in response to or proximate in time to a most recent event or that the content will be statistically most commonly used.

17. The apparatus of claim 12, wherein the at least one memory and the computer program code are further configured to, with the processor, cause the apparatus to cause, responsive to exposure of each level that has a subsequent level thereafter, an indication of existence of the subsequent level that includes one or more different notification classes relative to the notification classes of the one or more levels that are displayed.

18. The apparatus of claim 12, wherein the at least one memory and the computer program code are further configured to, with the processor, cause the apparatus to enable further extension of the notification bar to display a second level, separate from the first level, including one or more application shortcuts, wherein enabling extension and further extension of the notification bar comprises the first level to be displayed prior to causing the second level including the one or more application shortcuts to be displayed, and wherein the dynamic criteria defines the one or more application shortcuts included in the second level based upon the application shortcuts that are most commonly employed.

19. The apparatus of claim 18, wherein the at least one memory and the computer program code are configured to, with the processor, cause the apparatus to enable further extension of the notification bar by causing one or more additional levels of notification classes to be presented following the display of the second level including one or more application shortcuts.

20. The apparatus of claim 18, wherein the at least one memory and the computer program code are configured to, with the processor, cause the apparatus to enable further extension of the notification bar by causing the second level of one or more application shortcuts to be displayed at a leading edge of notification bar followed by the first level.

21. The apparatus of claim 12, wherein the at least one memory and the computer program code are further configured to, with the processor, cause the apparatus to:
enable further extension of the notification bar in order to cause one or more additional levels of notification classes to be displayed; and
cause a respective level including a respective notification class to be closed in response to a selection by a user while one or more other levels of notification classes continue to be displayed.

22. The apparatus of claim 21, wherein the at least one memory and the computer program code are configured to, with the processor, cause the apparatus to cause a respective level to be closed by closing the respective level including the respective notification class in response to user selection of an item from the respective notification class.

23. A computer program product comprising at least one non-transitory computer-readable storage medium having computer-executable program code instructions stored therein, the computer-executable program code instructions comprising program code instructions to:
enable, responsive to user input, extension of the notification bar away from the edge of the touch screen display to display a first level associated with a notification class from among a plurality of notification classes, wherein dynamic criteria defines the notification class to be included in the first level based upon a statistical probability that the content of the notification class included in the first level will be used; and
cause presentation of the notification bar to remain in an extended position away from the edge of the touch screen display so as to display one or more levels of notification classes upon cessation of the user input, wherein the extended position is the first level upon cessation of the user input,
wherein enablement of the extension of the notification bar comprises enabling extension of the notification bar to expose the first level responsive to a drag operation extending the notification bar to at least a threshold drag length corresponding to the first level, a further level associated with a different notification class being exposed in response to a further, separate and distinct, user input while the notification bar is extended comprising a drag operation in a retracting direction to expose a second level not previously exposed.

24. The method of claim 1, wherein the notification class of one level includes one or more messaging applications and the notification class of another level includes at least one of informational notices, currently running applications, available applications or a predefined set of application shortcuts.

25. The apparatus of claim 12, wherein the notification class of one level includes one or more messaging applications and the notification class of another level includes at least one of informational notices, currently running applications, available applications or a predefined set of application shortcuts.

26. The computer program product of claim 23, wherein the computer-executable program code instructions further comprise program code instructions to cause, responsive to exposure of each level that has a subsequent level thereafter, an indication of existence of the subsequent level that includes one or more different notification classes relative to the notification classes of the one or more levels that are displayed.

27. The computer program product of claim 23, wherein the computer-executable program code instructions further comprise program code instructions to enable further extension of the notification bar to display a second level, separate from the first level, including one or more application shortcuts, wherein enabling extension and further extension of the notification bar comprises the first level to be displayed prior to causing the second level including the one or more application shortcuts to be displayed, and wherein the dynamic criteria defines the one or more application shortcuts included in the second level based upon the application shortcuts that are most commonly employed.

28. The computer program product of claim 23, wherein the computer-executable program code instructions further comprise program code instructions to:
enable further extension of the notification bar in order to cause one or more additional levels of notification classes to be displayed; and
cause a respective level including a respective notification class to be closed in response to a selection by a user while one or more other levels of notification classes continue to be displayed.

* * * * *